(12) United States Patent
Klug

(10) Patent No.: US 6,663,807 B2
(45) Date of Patent: Dec. 16, 2003

(54) PROCESS FOR COMPLEX SHAPE FORMATION USING FLEXIBLE GRAPHITE SHEETS

(75) Inventor: Jeremy H. Klug, Brunswick, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 299 days.

(21) Appl. No.: 09/855,066

(22) Filed: May 14, 2001

(65) Prior Publication Data

US 2002/0167109 A1 Nov. 14, 2002

(51) Int. Cl.[7] ............................................. B29C 59/04
(52) U.S. Cl. ..................... 264/105; 264/136; 264/160; 264/283; 264/293; 264/296; 264/175; 428/408
(58) Field of Search ................................. 264/105, 136, 264/160, 284, 293, 296, 175; 428/408

(56) References Cited

U.S. PATENT DOCUMENTS

| 3,404,061 | A |  | 10/1968 | Shane et al. ................ 161/125 |
|---|---|---|---|---|
| 4,895,713 | A |  | 1/1990 | Greinke et al. .............. 423/448 |
| 5,527,363 | A |  | 6/1996 | Wilkinson et al. .......... 29/623.1 |
| 5,902,762 | A |  | 5/1999 | Mercuri et al. ................ 501/99 |
| 6,060,189 | A |  | 5/2000 | Mercuri et al. ................ 429/35 |
| 6,087,034 | A |  | 7/2000 | Mercuri ........................ 429/44 |
| 6,096,450 | A |  | 8/2000 | Walsh .......................... 429/34 |
| 6,413,671 | B1 | * | 7/2002 | Mercuri et al. ........... 429/231.8 |
| 6,432,336 | B1 | * | 8/2002 | Mercuri et al. ................ 264/51 |

* cited by examiner

Primary Examiner—Edmund H. Lee
(74) Attorney, Agent, or Firm—Waddey & Patterson P.C.; James R. Cartiglia

(57) ABSTRACT

Processes are provided for formation of complex shapes by embossing of a sheet of flexible graphite material. In one approach, a sheet of material is provided with a variable resin concentration across its width, and the position of the variable resin concentration is correlated with the position of embossing features which will result in thinner areas in the embossed articles. In a second approach, recesses are provided in the embossing rollers to accommodate material flow during embossing. These recesses result in protrusions formed on the articles, which protrusions must then be removed in a machining operation.

8 Claims, 3 Drawing Sheets

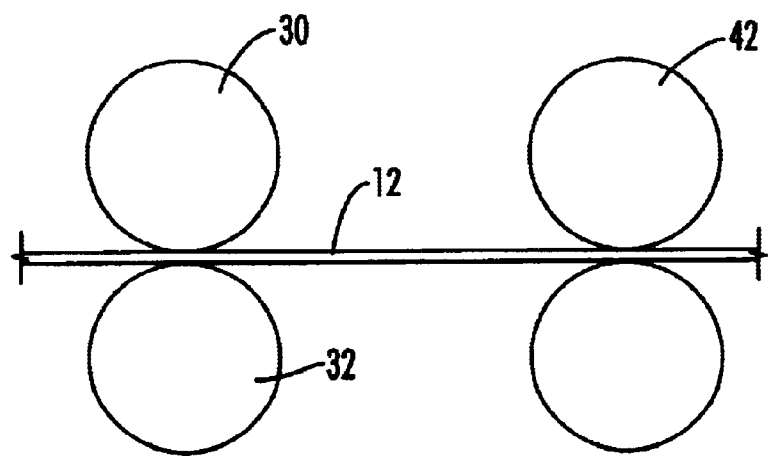
FIG. 3
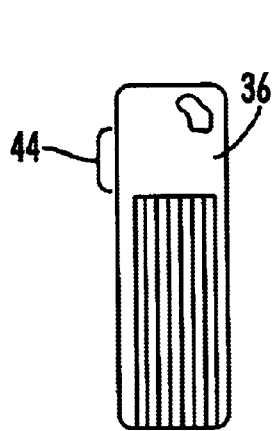 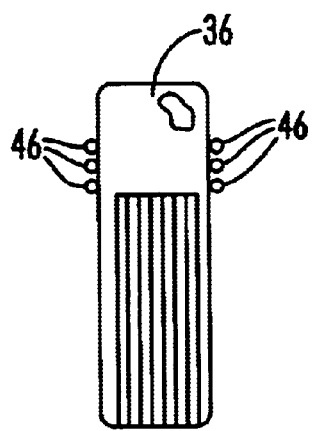 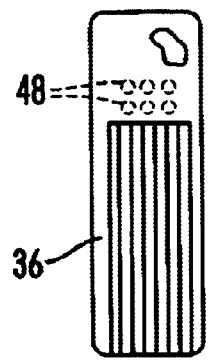 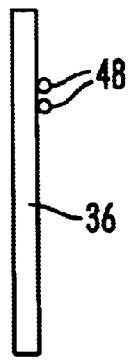
FIG. 4  FIG. 5  FIG. 6  FIG. 7

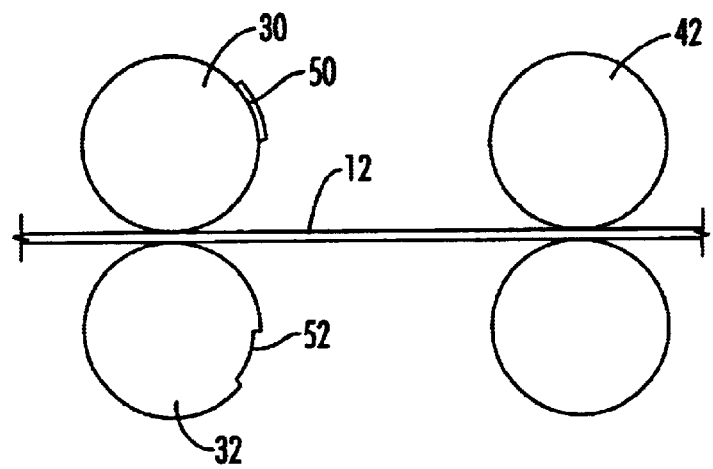
FIG. 8
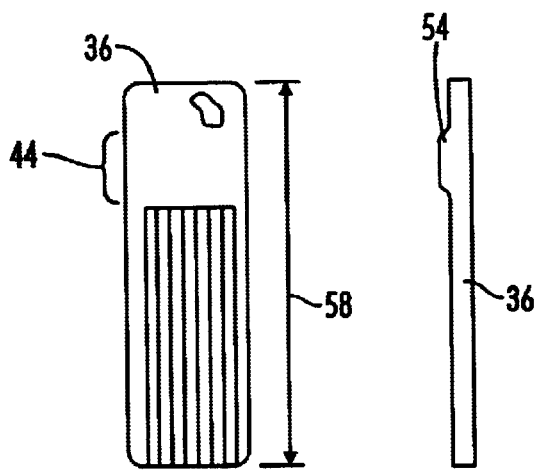
FIG. 9  FIG. 10
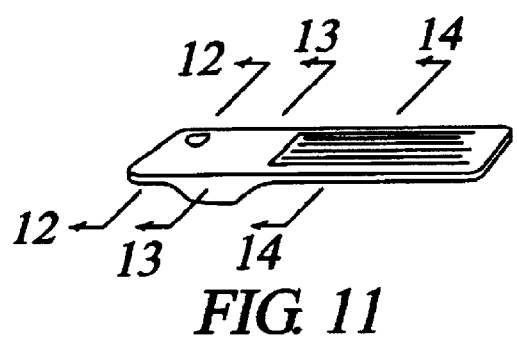
FIG. 11
  
FIG. 12  FIG. 13  FIG. 14

US 6,663,807 B2

PROCESS FOR COMPLEX SHAPE FORMATION USING FLEXIBLE GRAPHITE SHEETS

TECHNICAL FIELD

The present invention relates generally to processes and systems for manufacturing articles from sheets of flexible graphite material, and more particularly to systems for forming complex shapes wherein the systems are designed to control the flow of the graphite material and resin in the sheets during an embossing process.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

One limiting factor to the use of graphite materials, especially flexible graphite materials, as components for PEM fuel cells is the definition of a pattern embossed on the material, which, if not sufficient, can interfere with operation of the fuel cell, by permitting leaking of fluids, not permitting sufficient fluid flow through the fuel cell, or changing load and/or current paths through the cell.

Graphite's are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites by definition possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be chemically treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been chemically or thermally expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material is typically within the range of from about 0.04 g/cc to about 1.4 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude typically, for the "c" and "a" directions.

This considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and substantially less in the direction parallel to the major faces of the flexible graphite sheet ("a" direction). In applications such as electrodes for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the major surfaces of the flexible graphite sheet is relatively high, while it is relatively low in the "c" direction transverse to the major surfaces.

Flexible graphite sheet can also be provided with channels, which are preferably smooth-sided, and which pass between the parallel, opposed surfaces of the flexible graphite sheet and are separated by walls of compressed expanded graphite. When such a flexible graphite sheet functions as an electrode in an electrochemical fuel cell, it is placed so as to abut the ion exchange membrane, so that the "tops" of the walls of the flexible graphite sheet abut the ion exchange membrane.

The materials used to form components of fuel cells such as electrodes and flow field plates can be complex shapes which require a substantial amount of material movement when forming these shapes by embossing a resin impregnated flexible graphite sheet.

There is a continuing need for improved processes for the manufacture of such complex parts, and particularly for processes wherein the required movement of material is minimized so as to minimize tearing, warpage and the like of the flexible graphite sheet and the articles formed therefrom. The present invention provides such improved processes, which are particularly useful in the manufacture of materials that can be formed into components of electrochemical fuel cells, such as electrodes and flow field plates.

SUMMARY OF THE INVENTION

The present invention provides two approaches to solving this problem. In the first approach, a variable resin concentration is provided across the width of a sheet of material which is to be embossed, and the areas of lesser resin concentration are then correlated with areas of an embossing pattern having a lesser cross-section (that is a narrower gap between embossing rollers) so that the amount of resin which must be moved by the embossing pattern in these areas of lesser cross-section is reduced as compared to what would be required if embossing a sheet having uniform resin content across its width. The second approach to this problem utilizes a sheet of graphite material having substantial uniform thickness and uniform resin concentration, and modifies the pair of embossing rollers so as to allow space for movement of the graphite material to form a protrusion which can subsequently be removed.

In the first approach, a process is provided for forming articles from graphite material, which process includes the steps of:

(a) providing a sheet of variably impregnated flexible graphite material having a variable resin concentration across a width of the sheet; and (b) passing the variably impregnated sheet past an embossing roller having an embossing pattern of variable cross-section across the width of the sheet, the embossing pattern having areas of lesser sheet cross-section which correspond to areas of lesser resin content of the variably impregnated sheet, so that an amount of resin which must be moved lengthwise along the sheet during the embossing process is reduced as compared to a sheet having uniform resin content across its width.

The methods of the second approach can be described as methods of manufacturing articles having a variable thickness from a sheet of flexible graphite material of uniform thickness, the methods including the steps of:

(a) Providing a sheet of impregnated flexible graphite material having a substantially uniform thickness across a width of the sheet;

(b) Embossing the sheet between an embossing element and a landing element having embossing and landing surfaces, respectively, at least one of which surfaces includes a first recess for forming a protrusion on the embossed sheet; and (c) Removing the protrusion thereby providing an article having a variable thickness along a dimension of the article corresponding to the width of the sheet.

Accordingly, it is an object of the present invention to provide systems and processes for the manufacture of complex shapes from sheets of flexible graphite material.

Another object of the present invention is the provision of a process for providing a sheet of variably impregnated flexible graphite material having a variable resin concentration across a width of the sheet.

Another object of the present invention is the provisions of systems having embossing patterns of variable cross-section which are correlated with the presence of variable resin concentrations in a sheet of flexible graphite material to be embossed.

And another object of the present invention is the provision of systems and processes for manufacturing articles from sheets of flexible graphite material of uniform thickness, wherein provision is made for through-plane movement of graphite material thus forming protrusions which will later be removed, as contrasted to requiring lateral movement of material to achieve the embossing process.

Another object of the present invention is the provision of processes for embossing articles from flexible graphite material without rupturing or tearing the material during the embossing process.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is a schematic illustration of a portion of the process line wherein a finishing station is provided downstream of the embossing rollers. The finishing station provides a means for grinding or slicing off extruded excess material from the embossed article.

FIG. 4 is a schematic plan view of a complex article such as a flow field plate for a fuel cell.

FIG. 5 is a schematic plan view similar to FIG. 4 showing the location of gates in the backup roller adjacent the periphery of the article thus promoting in-plane resin and graphite flow during the embossing operation.

FIGS. 6 and 7 are plan and side views, respectively, of an article showing the position of gates on the backside of the article, which gates are formed in the backup roller, thus promoting through-plane resin and graphite flow to accommodate the required material displacement for formation of the article.

FIG. 8 is a schematic side elevation view of a portion of the manufacturing process wherein the embossing rollers include complementary positive and negative patterns to create a constant cross-sectional area across the article being formed, followed by a finishing station for removal of the excess material extruded to the backside of the article.

FIG. 9 is a plan view of the article formed in the process of FIG. 8.

FIG. 10 is a side view of the article of FIG. 9, showing a fin or ridge which has been formed on the backside by the embossing process and which must be removed at the finishing station of FIG. 8.

FIG. 11 is a perspective view of the embossed but not yet finally finished article of FIGS. 9 and 10.

FIGS. 12, 13 and 14 are cross-sectional views taken along lines 12—12, 13—13 and 14—14 of FIG. 11, respectively, to show the various cross-sectional shapes resulting from the embossing step of FIG. 8, prior to the finishing/material removal step of FIG. 8.

DETAILED DESCRIPTION OF THE PREFERRED EMBODIMENTS

Figure 1:
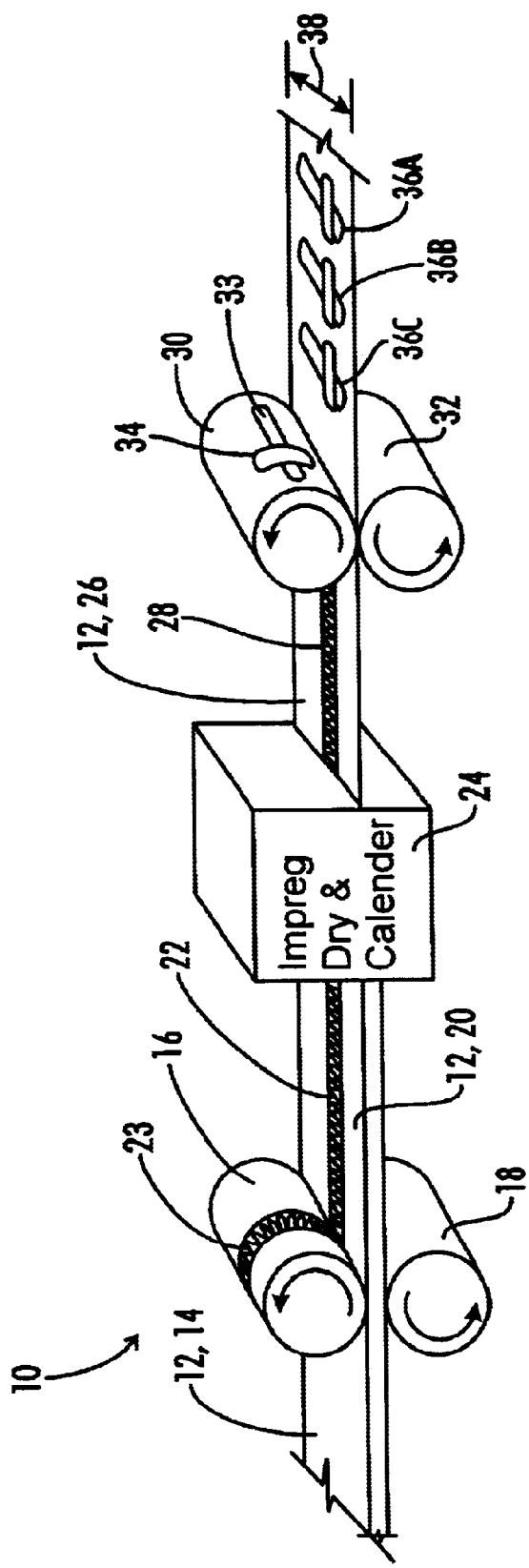
FIG. 1 is a perspective schematic view of an embossing process wherein a pair of precalendering rollers creates a high density strip in a sheet of flexible graphite material, which results in a lower resin concentration along that strip after impregnation and drying. The strip is correlated in position to a high flow area of the embossing pattern of the embossing rollers, so that there is less material which must be displaced by the high flow area of the embossing rollers.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than about six weight percent. More preferably, the graphite employed for the present invention will have a purity of at least about 98%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, eliminates through-plane permeability while increasing handling strength, i.e. stiffness, of the flexible graphite sheet as well as "fixing" the morphology of the sheet. Suitable resin content is preferably at least about 5% by weight, more preferably about 10 to 45% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolac phenolics.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a starting density of about 0.1 to about 1.1 g/cc, is thereafter processed to change the void condition of the sheet. By void condition is meant the percentage of the sheet represented by voids, which are generally found in the form of entrapped air. Generally, this is accomplished by the application of pressure to the sheet (which also has the effect of densifying the sheet) so as to reduce the level of voids in the sheet, for instance in a calender mill or platen press. Advantageously, the flexible graphite sheet is densified to a density of at least about 1.3 g/cc (although the presence of resin in the system can be used to reduce the voids without requiring densification to so high a level).

The void condition can be used advantageously to control and adjust the morphology and functional characteristics of the final embossed article. For instance, thermal and electrical conductivity, permeation rate and leaching characteristics can be effected and potentially controlled by controlling the void condition (and, usually, the density) of the sheet prior to embossing. Thus, if a set of desired characteristics of the final embossed article is recognized prior to manipulation of the void condition, the void condition can be tailored to achieve those characteristics, to the extent possible.

Advantageously, especially when the final embossed article is intended for use as a component in an electrochemical fuel cell, the resin-impregnated flexible graphite sheet is manipulated so as to be relatively void-free, to optimize electrical and thermal conductivities. Generally, this is accomplished by achieving a density of at least about 1.4 g/cc, more preferably at least about 1.6 g/cc (depending on resin content), indicating a relatively void-free condition.

The calendered flexible graphite sheet is then passed through an embossing apparatus as described herein below, and thereafter heated in an oven to cure the resin. Depending on the nature of the resin system employed, and especially the solvent type and level employed (which is advantageously tailored to the specific resin system, as would be familiar to the skilled artisan), a vaporization drying step may be included prior to the embossing step. In this drying step, the resin impregnated flexible graphite sheet is exposed to heat to vaporize and thereby remove some or all of the solvent, without effecting cure of the resin system. In this way, blistering during the curing step, which can be caused by vaporization of solvent trapped within the sheet by the densification of the sheet during surface shaping, is avoided. The degree and time of heating will vary with the nature and amount of solvent, and is preferably at a temperature of at least about 65° C. and more preferably from about 80° C. to about 95° C. for about 3 to about 20 minutes for this purpose.

One embodiment of an apparatus for continuously forming resin-impregnated and calendared flexible graphite sheet is shown in International Publication No. WO 00/64808 the disclosure of which is incorporated herein by reference.

Referring now to the drawings, and particularly to FIG. 1, a system or processing line for forming articles from an elongated sheet 12 of flexible graphite material is shown and generally designated by the numeral 10.

In the system 10, the sheet 12 of flexible graphite material is shown in a continuous process. The sheet 12 begins at the left hand end of the system 10 as a sheet of mat material 14. The mat material 14 moves through a pair of precalendering rollers 16 and 18 and exits the precalendering operation as a precalendered mat 20 having a high density strip 22 defined therein. The high density strip 22 is formed by a protruding ridge 23 on the roller 16.

The precalender strip 20 then moves through a station 24 at which the mat is impregnated, dried and calendered to form a sheet 26 of resin impregnated flexible graphite material having a strip 28 of relatively lower resin density. The sheet 26 then moves through an embossing station where it is passed between embossing rollers 30 and 32. The embossing roller 30 has an embossing pattern defined thereon, which pattern includes embossing features 33 and 34. Feature 34 of the embossing pattern is higher than surrounding areas of the pattern and thus the resulting thickness of the finished article will be thinner. This feature 34 which creates a high material flow corresponds to the position of the strip 28 of lower resin content, so that there is less resin material which must be displaced by the feature 34.

The embossing rollers 30 result in embossed articles 36a, 36b, 36c, etc. being formed in a continuous series in the sheet 26. The articles 36 will subsequently be separated from each other.

The process performed by the system 10 can generally be described as a process of forming articles 36 from a sheet 12 of flexible graphite material.

The process includes a first step of providing a sheet 26 of variably impregnated flexible graphite material having a variable resin concentration across the width 38 of the sheet. As previously noted, the strip 28 will have a lower resin concentration. This is because the strip 22 in the precalendered mat 20 has been compressed to a higher density than the remainder of the precalendered mat 20 and thus will absorb less resin when a resin and acetone solvent carrier mixture is sprayed upon the precalendered mat 20 in the processing station 24. Since less resin will be absorbed in the high density strip 22, there will be a lesser resin concentration in the strip 28 of the sheet 26.

The second step in the process, which is performed by embossing rollers 30 and 32, can be described as passing the variably impregnated sheet 26 past an embossing roller 30 having an embossing pattern 33, 34 of variable cross-section areas across the width 38 of the sheet 26.

The embossing pattern has a feature such as 34 which creates an area of lesser cross-section in the finished article, which corresponds to the areas 28 of lesser resin content of the variably impregnated sheet 26, so that an amount of resin which must be moved lengthwise along the sheet within the plane of the sheet 26 during the embossing process is reduced as compared to the amount of material which would have to be moved in a sheet of uniform resin content across its width.

The steps performed by the precalendering rollers 16 and 18 and by the processing station 24 can be described as precalendering the sheet 12 when the sheet is in the form of an unimpregnated mat 14, so that the mat 14 has a variable density across the width 38, and then impregnating the variable density mat 20 with resin at processing station 24, so that an area 22 of higher density mat becomes an area 28 of lower weight percentage resin concentration across the width 38 of the sheet 26.

In the processing station 24, the entire width 38 of the sheet 20 of precalendered mat will be sprayed with the same constant resin solution, so that the variable resin concentration of strip 28 is a function solely of the variable density of the strip 22 of the precalendered mat 20.

Figure 2:
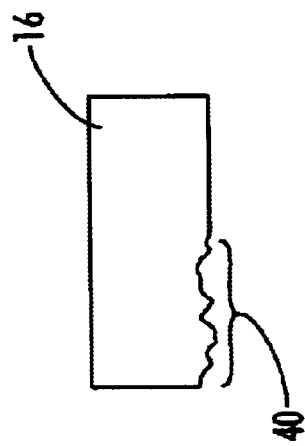
FIG. 2 is a schematic elevation side view of a precalendering roller having a complex outer surface so that several different resin weight percentage areas are created across the width of the sheet of flexible graphite material.

As shown in FIG. 2, the precalendering roller 16 can have an area 40 of very complex cross-section which will result in a complex variation in density across the width of the precalendered sheet 20 thus resulting in a complex variation of resin concentration across the width of the sheet 26. This can be described as creating at least three areas each having a different mat density across the width of the precalendered mat 20.

Turning now to FIGS. 3–14, another approach is shown for the manufacture of complex shaped articles through embossing of flexible graphite sheets.

The approaches of the process illustrated in FIGS. 3–7 and that of FIGS. 8–14 involve changing the patterned embossing process to produce modified articles that would then need to be finished in a secondary operation at the finishing station 42. The approach of FIGS. 3–7 involves the positioning of relief gates, i.e., recesses, in either the embossing pattern of primary embossing roller 30 or support roller 32, which will result in a plurality of protrusions on the embossed article which must then be removed in the finishing station 42. The approach of FIGS. 8–14 is related, but is somewhat more complex in that the supporting roller 32 is machined to have a negative pattern correlated with the positive embossing pattern of primary roller 30 so that there is a substantially uniform cross-sectional area of the embossed part across the entire width of the sheet 12.

Referring now to FIG. 3, embossing station comprised of embossing rollers 30 and 32 is shown for embossing the sheet 12, and downstream of the embossing station is a finishing station 42 which is only schematically illustrated. The finishing station 42 will provide a means for grinding or slicing off unwanted material from the embossed articles as further described below. It will be understood that upstream of the embossing rollers 30 and 32 will be conventional smooth cylindrical precalendering rollers and an impregnation, drying and calendaring station so that the sheet 12 of material entering the embossing rollers 30 and 32 is a smooth sheet of flexible graphite material of uniform thickness, and of uniform resin concentration across its width. In the processes of FIGS. 3–7 and that of FIGS. 8–14, the material movement required for the formation of complex shapes in the embossing process will be accommodated by providing cavities in the rollers 30 and/or 32 which allow unwanted material to flow into protrusions which will subsequently be machined away at the finishing station 42.

For example, FIG. 4 shows a plan view of an article 36 which is to be formed. The article 36 has a region 44 where the substantial material flow is required in the embossing process.

FIG. 5 illustrates one means in which the flow from the area 44 may be accommodated. In FIG. 5, there is schematically illustrated gates or recesses 46 which will be formed in the outer surface of the supporting roller 32 adjacent the periphery of the article 36 which will result in protrusions extending from the periphery of the article 36 after the sheet 12 moves through the embossing station 30, 32. Those protrusions will be machined away in the finishing station 42.

Alternatively, FIGS. 6 and 7 illustrate the positioning of gates 48 in the supporting roller 32 directly behind the area 44 so that protrusions will be formed on the backside of the article 36. Again, those protrusions will be machined away at finishing station 42.

In the process of FIGS. 3–7, the relief gates such as 46 or 48 are positioned at high stress areas where material needs to be removed for proper part definition and dimension. These gates 46 or 48 can be positioned at the periphery of the part as shown in FIG. 5 or more desirably at locations within the plane where high, localized regions of material flow or removal are needed as seen in FIGS. 6 and 7. The gates can be located to promote material movement in-plane toward the outside of the plate, as shown in FIG. 5, or to the bottom of the part, i.e. through-plane movement, as shown in FIGS. 6 and 7. The through-plane movement of FIGS. 6 and 7 is believed to be more advantageous since it would allow gate positioning anywhere on the part 36 and not only around its perimeter.

Turning now to the process illustrated in FIGS. 8–14, this can be generally described as a constant cross-section process which would yield substantially only through-plane resin and material flow for the articles 36. As previously noted, it is desirable to have primarily through-plane flow since no material would then have to be pushed away laterally during the embossing operation. Achieving this substantially all through-plane flow would be possible through machining a negative pattern 52 on the bottom roller 32 to create excess volume for the material to move to during the embossing areas which will be relatively thin areas of the finished article.

Thus, as shown in FIG. 8, the primary embossing roller has an embossing pattern 50 defined thereon which includes raised areas which will result in corresponding thin areas of the embossed article. The support roller 32 will have a complementary negative pattern 52 defined therein to receive the material displaced by the positive embossing pattern 50. It will be understood that the positive and negative patterns 50 and 52 are only schematically illustrated in FIG. 8, and no attempt has been made to illustrate the exact patterns which would result in the article shown in FIGS. 9–14.

As shown in FIGS. 10 and 11, this will result in a fin or ridge 54 which may be generally referred to as a protrusion 54 on the backside of the embossed article 36. That protrusion 54 will then be removed in the finishing station 42.

Both the method of FIGS. 3–7 and that of FIGS. 8–14 may be described as methods for manufacturing articles 36 having a variable thickness from a sheet of flexible graphite material 12 of uniform thickness, which methods include the steps of:

(a) providing the sheet 12 of flexible graphite material having a substantially uniform thickness across a width 38 of the sheet;

(b) embossing the sheet 12 between an embossing element 30 and a landing element or support roller 32 having embossing and landing surfaces, respectively, at least one of which surfaces includes a first recess (46, 48 or 52) for forming a protrusion (such as 54) on the embossed sheet; and (c) removing the protrusion thereby providing the article 36 having a variable thickness 56 along a dimension 58 of the article corresponding to the width 38 of the sheet 12.

Thus, it is seen that the methods of the present invention readily achieve the ends and advantages mentioned as well as those inherent therein. While certain preferred embodiments of the invention have been illustrated and described for purposes of the present disclosure, numerous changes in the arrangement of steps may be made by those skilled in the art, which changes are encompassed within the scope and spirit of the present invention as defined by the appended claims.

What is claimed is:

1. A process of forming articles from a graphite material, the process comprising steps of:

(a) providing a sheet of variably impregnated flexible graphite material having a variable resin concentration across a width of the sheet; and (b) passing the variably impregnated sheet past an embossing roller having an embossing pattern of variable cross-section across the width of the sheet, the embossing pattern having a raised area which corresponds to an area of lesser resin content of the variably impregnated sheet, so that an amount of resin which must be moved in the plane of the sheet during the embossing process is reduced as compared to a sheet having uniform resin content across its width.

2. The process of claim 1, wherein step (a) further comprises:

(a)(1) precalendering the sheet when the sheet is in the form of an unimpregnated mat, so that the mat has a variable density across the width of the sheet; and (a)(2) impregnating the variable density mat with resin, so than an area of higher density mat becomes an area of lower weight % resin concentration across the width of the sheet.

3. The process of claim 2, wherein step (a)(2) further comprises applying a constant resin solution across the width of the sheet, so that the variable resin concentration across the width of the sheet is a function solely of the variable density of the mat of step (a)(1).

4. The process of claim 2, further comprising:

between step (a)(2) and step (b), drying and calendering the resin impregnated mat.

5. The process of claim 2, wherein:

step (a)(1) further comprises creating at least three areas each having a different mat density across the width of the sheet.

6. The process of claim 1, further comprising:

severing the embossed sheet into a plurality of articles, each article having a variable thickness across the width of the sheet.

7. The process of claim 6, wherein the articles are components for a fuel cell.

8. The process of claim 6, wherein the articles are flow field plates for a fuel cell.

* * * * *